(12) United States Patent
Papiani et al.

(10) Patent No.: US 11,858,754 B2
(45) Date of Patent: Jan. 2, 2024

(54) APPARATUS FOR HANDLING BOTTLES AND RELATED MACHINE

(71) Applicant: RUFFINO S.R.L., Pontassieve (IT)

(72) Inventors: Gianni Papiani, Pontassieve (IT); Elisa Bugatti, Pontassieve (IT); Niccoló Perini, Pontassieve (IT)

(73) Assignee: RUFFINO S.R.L., Pontassieve (IT)

( * ) Notice: Subject to any disclaimer, the term of this patent is extended or adjusted under 35 U.S.C. 154(b) by 0 days.

(21) Appl. No.: 17/690,581

(22) Filed: Mar. 9, 2022

(65) Prior Publication Data
US 2022/0340375 A1   Oct. 27, 2022

(30) Foreign Application Priority Data

Mar. 11, 2021  (IT) ........................ 102021000005771

(51) Int. Cl.
*B65G 47/82*  (2006.01)
*B65G 15/28*  (2006.01)
(Continued)

(52) U.S. Cl.
CPC ............. *B65G 47/82* (2013.01); *B65G 15/28* (2013.01); *B65G 23/44* (2013.01); *B65G 47/52* (2013.01); *B65G 2201/0244* (2013.01)

(58) Field of Classification Search
CPC ........ B65G 47/82; B65G 15/28; B65G 23/44; B65G 47/52; B65G 2201/0244;
(Continued)

(56) References Cited

U.S. PATENT DOCUMENTS 4,094,411 A * 6/1978 Kronseder ............. B65G 29/00
                                                     209/522
4,428,474 A * 1/1984 Gau ....................... B65C 9/067
                                                     198/377.07
(Continued)

FOREIGN PATENT DOCUMENTS

BE    1013092 A6    9/2001
DE    4235369 C1 *  3/1994  .......... B65G 47/841
(Continued)

OTHER PUBLICATIONS

Italian Search Report dated Nov. 25, 2021 from counterpart Italian Patent Application No. 102021000005771.

*Primary Examiner* — Gene O Crawford
*Assistant Examiner* — Abby A Jorgensen
(74) *Attorney, Agent, or Firm* — SEYFARTH SHAW LLP; Brian Michaelis

(57) ABSTRACT

A machine for handling bottles includes first and a second conveyor belts to advance the bottles. The first conveyor belt has a first direction of advancement and the second conveyor belt has a second direction of advancement. The first and second directions of advancement are incident to each other. A deflector device connects the first and second conveyor belts, and includes outer and inner guide bodies to contain the bottles. The inner guide body includes a belt to advance the bottles. Conditioning elements change the configuration of the inner guide body varying its relative position with respect to the outer guide body and the radius of curvature of the advancing belt. The conditioning elements include an element pushing a respective element for tensioning the belt. The pushing element has adjustment elements to vary the thrust applied on the tensioning element and the curvature of the belt.

9 Claims, 5 Drawing Sheets

(51) Int. Cl.
*B65G 23/44* (2006.01)
*B65G 47/52* (2006.01)

(58) Field of Classification Search
CPC .............. B65G 47/766; B65G 2207/08; B65G 21/2054; B65G 47/5113
See application file for complete search history.

(56) References Cited

U.S. PATENT DOCUMENTS

| | | | |
|---|---|---|---|
| 4,680,463 A * | 7/1987 | Lutgendorf | B65G 17/26 250/223 B |
| 2003/0178284 A1* | 9/2003 | Steeber | B65G 47/52 198/370.01 |
| 2005/0284103 A1* | 12/2005 | Hartness | B65G 17/323 53/167 |
| 2005/0284735 A1* | 12/2005 | Hartness | B65G 17/42 198/850 |
| 2017/0341877 A1* | 11/2017 | Hanselman | B65G 47/5131 |

FOREIGN PATENT DOCUMENTS

| | | | | |
|---|---|---|---|---|
| DE | 4235369 C1 | 3/1994 | | |
| DE | 102018005616 A1 * | 1/2020 | ......... | B65G 21/2054 |
| DE | 102018005616 A1 | 1/2020 | | |
| WO | WO-2004076315 A2 * | 9/2004 | ......... | B65G 47/5131 |
| WO | 2014196862 A1 | 12/2014 | | |
| WO | WO-2014196862 A1 * | 12/2014 | ............ | B65G 17/44 |
| WO | WO2014196862 A1 | 12/2014 | | |
| WO | WO-2015173004 A1 * | 11/2015 | ............ | B65G 29/00 |
| WO | 2016080826 A1 | 5/2016 | | |
| WO | WO-2016080826 A1 * | 5/2016 | ............ | B65G 15/02 |
| WO | WO2016080826 A1 | 5/2016 | | |

* cited by examiner

APPARATUS FOR HANDLING BOTTLES AND RELATED MACHINE

This application claims priority to Italian Patent Application 102021000005771 filed Mar. 11, 2021, the entirety of which is incorporated by reference herein.

This invention relates to an apparatus for handling bottles.

Moreover, the invention relates to a machine for handling bottles, comprising the above-mentioned apparatus.

During the packaging of products, such as in the bottling of wine, it is necessary to move the bottles, for example made of glass or Tetra Pak, to various processing or storage stations.

For this purpose, the use of conveyor belts is known.

In order to optimise the spaces available for the production, the prior art teaches the use of curved conveyor belts, that is to say, such as to divert the trajectory of the containers according to predetermined paths.

During the same processing, or for different production batches, it may be necessary to change the type of container or bottle.

When this occurs it is useful to adapt the containment side panels of the conveyor belts, in order to guarantee the stability of the bottle whilst it advances, and limit the oscillations.

In effect, these oscillations might cause the bottle to fall along its path, thus adversely affecting the processing.

Especially in the case of curved conveyor belts, wherein it is necessary to modify the trajectory of the bottle during its advance, the role of the containment side panels is even more important in order to guarantee the correct stability in the advancement of the bottle in the curved stretch.

There are prior art curved side panels, or deflectors, designed to be inserted on the inner side of the curve (smallest radius of curvature), and on the outer side of the curve (greatest radius of curvature).

For each type of bottle there are deflectors and/or curved side panels suitable for the purpose, and which are able to stably contain the bottles.

For example, for small containers, outer and inner guides are used, with smaller radiuses of curvature.

Depending on the type of processing it is therefore necessary to replace the deflectors and/or the curved side panels, both on the inner side and on the outer side.

In order to overcome this drawback, solutions are known in which only one of the two side panels is replaced, when a new processing uses a container which has a different size to that of the previous processing.

Even though these solutions allow a single side panel to be replaced, instead of both the side panels, it is in any case necessary to have a sufficient number of side panels, at least equal to each type of container used in the production.

Moreover, in these situations it is in any case necessary to stop the machining to carry out the replacement of the side panel.

The aim of the invention is therefore to provide an apparatus for handling bottles which is able to overcome the above-mentioned drawbacks of the prior art.

A further aim of the invention is to provide an apparatus for handling bottles, and a relative machine, which are at the same time practical to use and simple and inexpensive to make.

According to the invention, these aims and others are achieved by an apparatus for handling bottles, and a relative machine, comprising the technical features described in the accompanying claims.

The technical features of the invention, with reference to the above-mentioned aims, are clearly described in the appended claims and its advantages are apparent from the detailed description which follows, with reference to the accompanying drawings which illustrate purely non-limiting example embodiments of the invention, in which:

Figure 1:
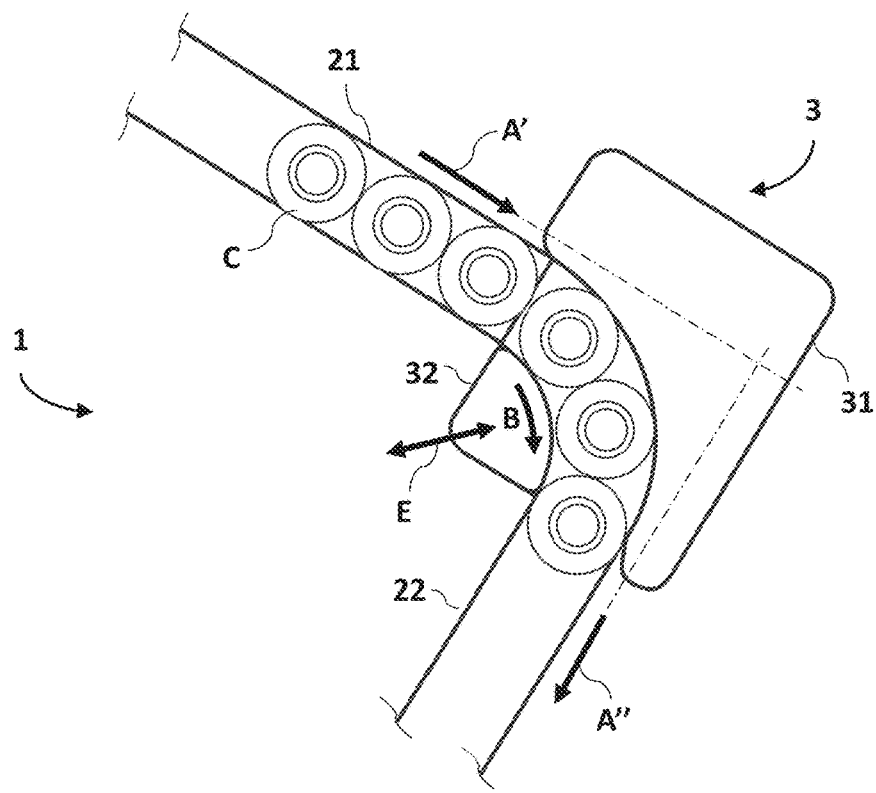
FIG. 1 is a schematic top view of an embodiment of the apparatus for handling bottles according to the invention.

With reference to the accompanying drawings, the numeral 1 denotes in its entirety an apparatus for handling bottles C made in accordance with the invention, hereinafter also referred to simply as the apparatus 1.

With reference to the accompanying drawings, the apparatus 1 comprises a first conveyor belt 21, a second conveyor belt 22, and a deflector device 3.

The first 21 and the second 22 conveyor belt are of known type and are such as to advance the bottles C.

More specifically, the first conveyor belt 21 has a first advancement direction A'.

The second conveyor belt 22 has a second advancement direction A".

The first direction of advancement A' and the second direction of advancement A" are incident with each other.

With reference to the accompanying drawings, the first A' and the second A" advancement direction are rectilinear.

Moreover, again with reference to the accompanying drawings, the first A' and the second A" advancement direction are perpendicular to each other.

Advantageously, both the first 21 and the second 22 conveyor belt comprise a motor designed to move the respective belt.

The apparatus 1 also comprises a deflector device 3 for connecting the first 21 and the second 22 conveyor belts.

The deflector device 3 comprises an outer guide body 31 and an inner guide body 32.

The outer guide body 31 contains the bottles C as they advance.

The inner guide body 32 contains the bottles C, during their advancement, on the side opposite the outer guide body 31.

In that way, the bottles C advance in a stable fashion along the curved stretch, formed by the outer guide body 31 and by the inner guide body 32, as illustrated in FIG. 1, and in FIGS. 6 to 9.

With reference to FIGS. 6 to 9, the outer guide body 31 comprises an advancing belt 311, closed in a loop around pulleys 312.

At least one of the pulleys 312 is motor-driven.

Figure 8:
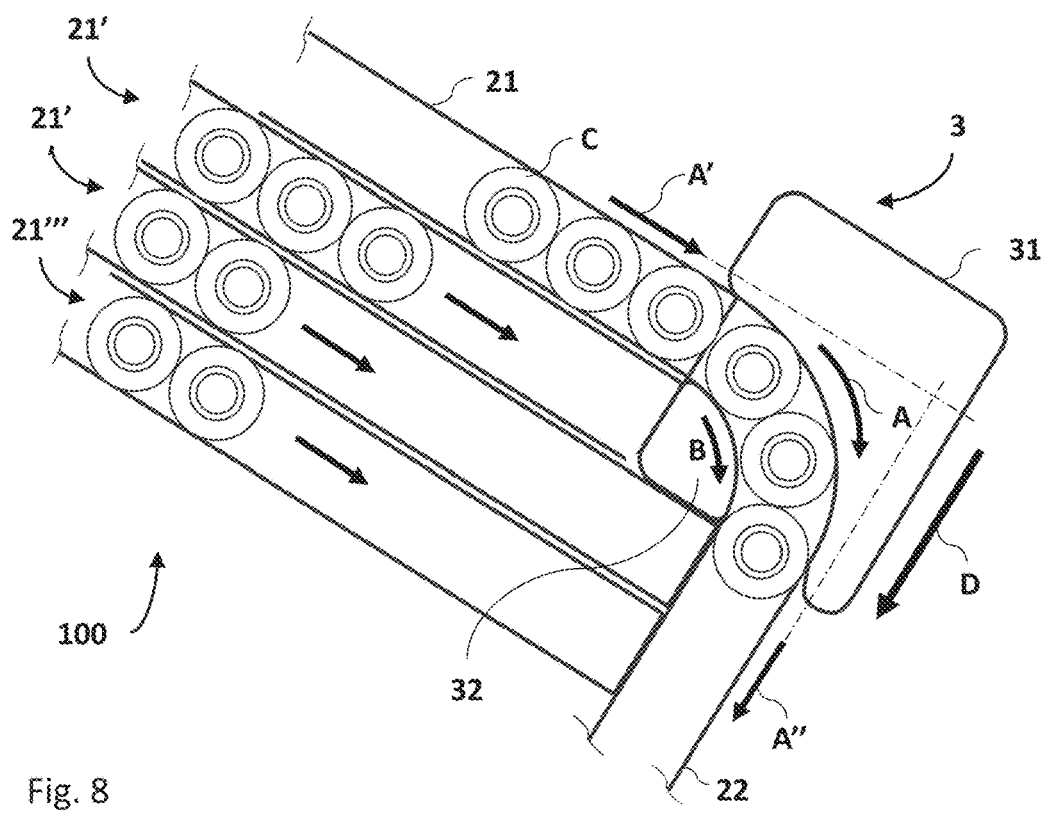
FIG. 8 is a schematic top view of a different configuration of use of the machine of FIGS. 6 and 7.
Figure 9:
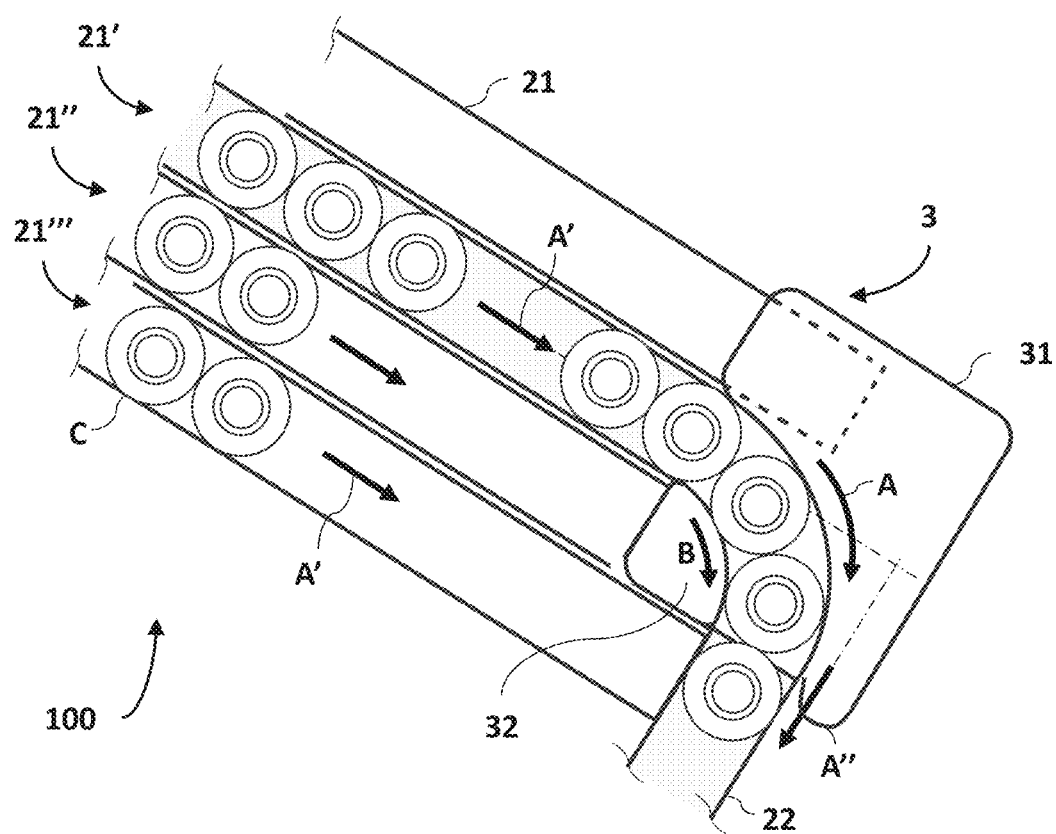
FIG. 9 is a schematic top view of a different configuration of use of the machine of FIGS. 6 and 7.

The advancing belt 311 is movable, with the advancement direction A, as illustrated in FIGS. 8 and 9.

When the advancing belt 311 is movable, the bottles C advance along the curved stretch, due to the movement of the advancing belt 311.

In effect, according to these solutions, the sliding of the bottles C in the curved stretch is facilitated.

With reference to FIG. 1, the outer guide body 31 does not have the advancing belt 311.

According to this embodiment, the advancement of the bottles C is obtained due to the advancing of the bottles behind, which push, and advance, the bottles in front.

This is achieved by the movement of the first conveyor belt 21 and the second conveyor belt 22.

According to embodiments wherein the advancing belt 311 is not present, lubricating means are advantageously used for the containment wall of the outer guide body 31, that is to say, in contact with the bottles C, to facilitate their advancement.

The inner guide body 32 comprises a belt 321 for advancing bottles C.

The advancing belt 321 is closed in a loop around respective pulleys 322, 323, 324.

The advancing belt 321 is movable and advances along the curved advancement direction B, as illustrated in FIGS. 1, 8 and 9.

Advantageously, one of the pulleys 322, 323, 324 is motor-driven.

Figure 2:
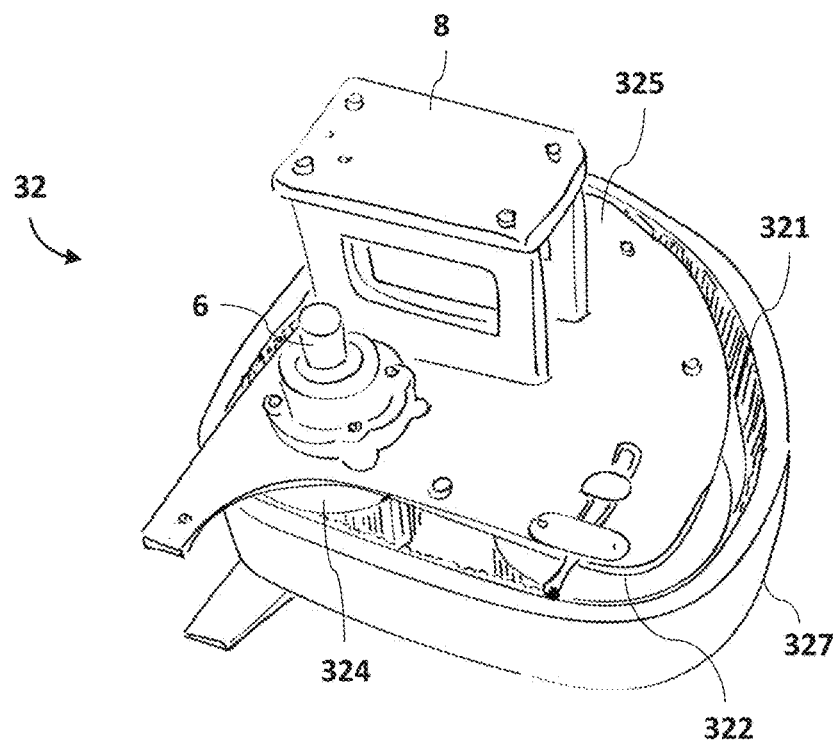
FIG. 2 is a schematic perspective view from a different angle of certain details of the handling apparatus of FIG. 1.
Figure 3:
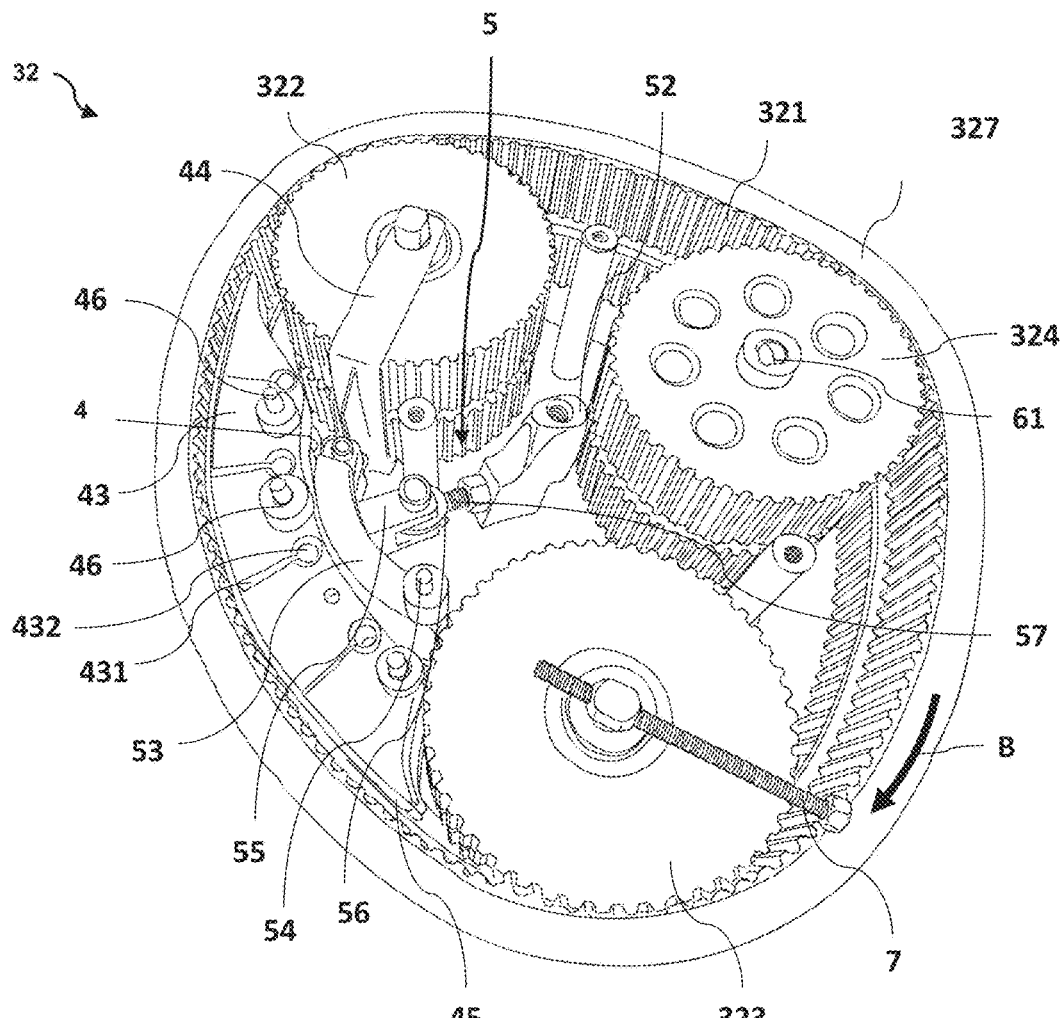
FIG. 3 is a schematic perspective view from a different angle of certain details of the handling apparatus of FIG. 1.
Figure 4:
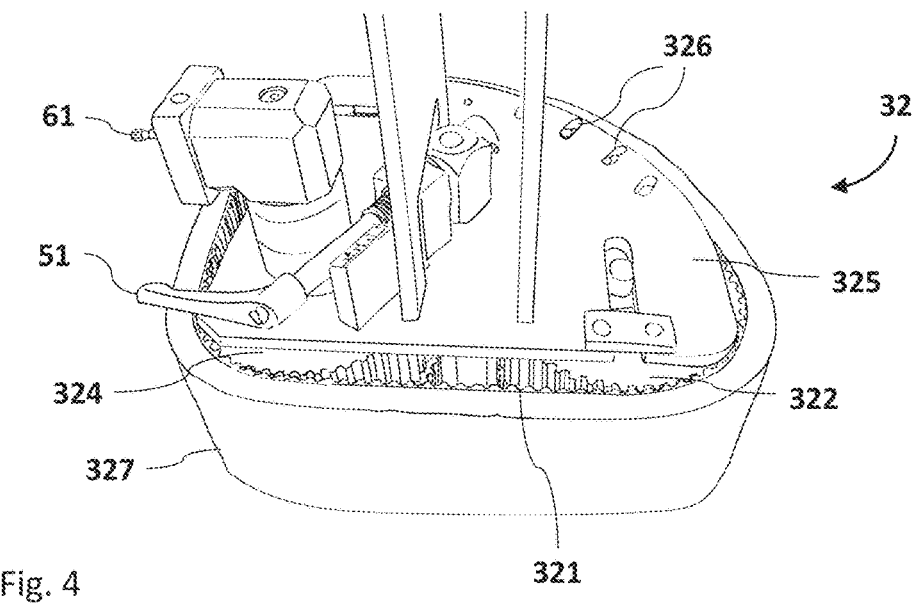
FIG. 4 is a schematic perspective view from a different angle of certain details of the handling apparatus of FIG. 1.

With reference to FIGS. 2, 3 and 4, the pulley 324 is the motor-driven one.

The motor-driven pulley 324 has a coupling 61 for the drive shaft 6 which moves the advancing belt 321.

With reference to the accompanying drawings, the pulleys 322 and 323 are both idle.

With reference to the accompanying drawings, the inner guide body 32 comprises a sponge 327.

The sponge 327 is positioned on at least part of the surface of the advancing belt 321, in contact with the bottles C.

The sponge 327 is advantageously of the soft type.

This solution makes it possible to dampen the impacts between the bottles C and the advancing belt 321.

The inner guide body 32 also comprises a cover 325 to protect the inner guide body 32.

The cover 325 has slots 326, described in more detail below.

The cover 325 allows a pushing element 5 to be housed, and more specifically, the adjustment means.

The cover 325 is also connected to the frame 8 of the apparatus 1, and/or of the machine 100 described in more detail below.

The apparatus 1 also comprises conditioning means 4 for modifying the configuration of the inner guide body 32.

More specifically, the configuration of the inner guide body 32 is modified by varying at least one between its relative position with respect to the outer guide body 31 and the radius of curvature of the advancing belt 321.

Figure 5:
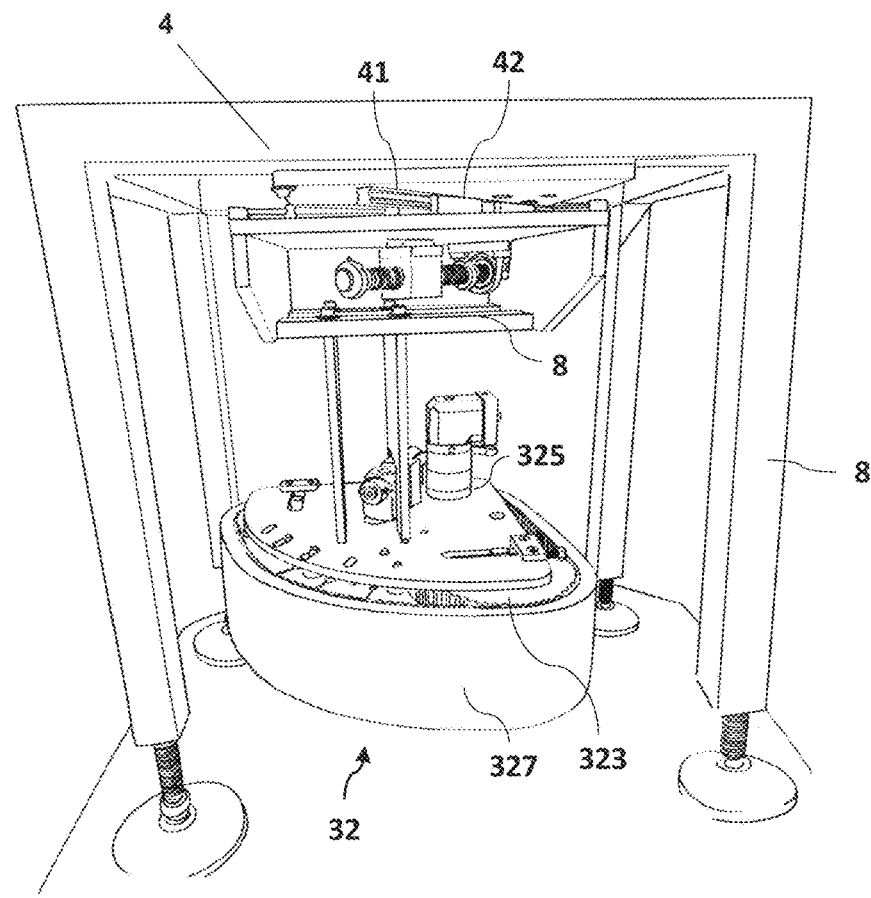
FIG. 5 is a schematic perspective view from a different angle of certain details of the handling apparatus of FIG. 1.
Figure 6:
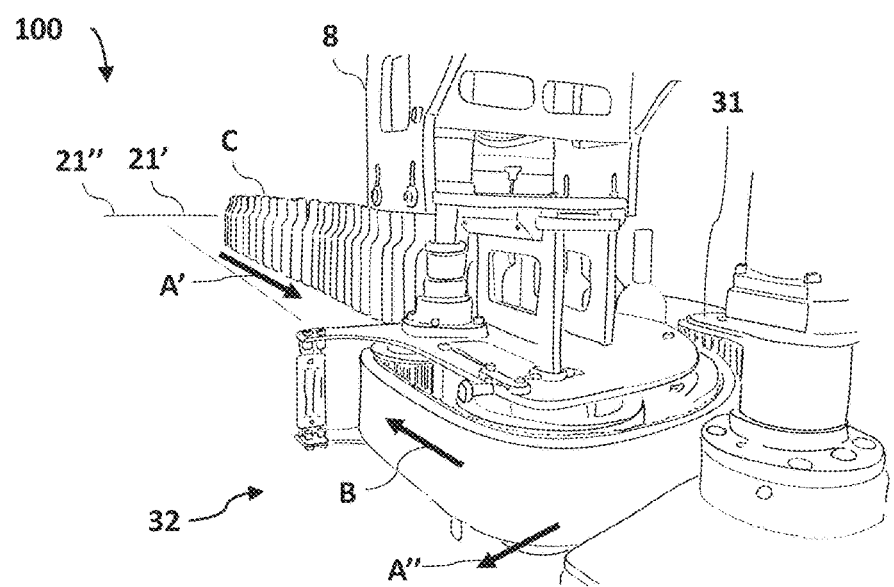
FIG. 6 is a schematic perspective view from a different angle of an embodiment of the machine for handling bottles according to the invention.

The conditioning means 4 comprise a guide 41 and a skid 42, as illustrated in FIG. 5.

With reference to FIG. 5, the guide 41 is connected to the frame 8 of the apparatus 1, and the skid 42 is connected to the inner guide body 32.

The skid 42 and the guide 41 are configured to translate relative to each other the inner guide body 32 and the outer guide body 31.

More specifically, thanks to the skid 42 and the guide 41, the outer guide body 31 and the inner guide body 32 move towards/away from each other along a radial direction E of translation.

More specifically, the radial direction E of translation coincides with a radius of curvature between the outer guide body 31 and the inner guide body 32.

Advantageously, the skid 42 is of the recirculating ball screw type.

The conditioning means 4 also comprise a tensioning element 43 positioned inside the ring formed by the belt 321, as illustrated in FIG. 3.

The tensioning element 43 is elastically deformable so that the belt 321 can adopt many different radiuses of curvature.

Advantageously, the element 43 is made of a material chosen from among polyzen, polystyrene, polyurethane, rubber or a combination of them.

Advantageously, the element 43 extends for a length of between 10% and 80% of the length of the advancing belt 321.

The tensioning element 43 has at least one slot 431 of preferential deformation.

With reference to FIG. 3, the tensioning element 43 has 3 recesses 431 of preferential deformation.

The greater the number of recesses 431, the greater is the deformation allowed by the tensioning element 43.

The recesses 431 advantageously have holes 432 for discharging the stresses in order to reduce the risk of fractures of the tensioning element 43.

The tensioning element 43 comprises a plurality of guide pins 46.

Advantageously, the guide pins 46 are located on the innermost side of the tensioning element 43.

In that way, during elastic deformation of the tensioning element 43, the guide pins 46 undergo a reduced deformation.

The conditioning means 4 comprise a sliding guide 45 positioned between the tensioning element 43 and the advancing belt 321.

The sliding guide 45 is connected to one end of the tensioning element 43, whilst the other end is left free.

The sliding guide 45 prevents the advancing belt 321 from jamming or braking by the recesses 431.

Advantageously, the free end of the sliding guide 45 allows the sliding guide 45 to adapt to any curvature of the tensioning element 43.

For this reason, the free end of the sliding guide 45 is the first end which is encountered following the direction of advancement of the curved direction of advancement B of the inner guide body 32.

With reference to FIG. 3, the end of the sliding guide 45 connected to the tensioning element 43 is approximately at the pulley 323.

The conditioning means 4 comprise means 5 for pushing the tensioning element 43.

Advantageously, the pushing element 5 applies a pressure on the tensioning element 43 to deform it elastically.

The pushing element 5 comprises adjusting means configured to vary the thrust applied on the tensioning element 43.

As illustrated in FIG. 4, a control screw 51 defines the adjustment means for the apparatus 1.

According to an embodiment, illustrated in FIG. 3, the pushing element 5 comprises an angular drive 52 constrained to the control screw 51 in such a way that a rotation of the control screw 51 causes the angular drive 52 to advance.

The pushing element 5 also comprises a pushing bar 53 to impart a pressure on the tensioning element 43.

Advantageously, the pushing bar 53 is semi-circular in shape in such a way as to impart a uniform or almost uniform pressure on the tensioning element 43.

The pushing bar 53 is pivoted at one of its ends.

The pin 54 represents the rotation pin of the pushing bar 53.

The pushing element 5 comprises a fork 55 constrained to the pushing bar 53.

The pushing element 5 comprises a connecting rod head 56 which engages on the fork 55.

The pushing element 5 comprises a threaded shaft 57, which constrains the angular drive 52 to the connecting rod head 56.

Again with reference to FIG. 3, the conditioning means 4 comprise a connecting element 44.

The connecting element 44 connects the pulley 322 to the pushing means 5 for modifying the relative position of the pulley 322 relative to the other pulleys 323 and 324, when the tensioning element 43 is elastically deformed.

More specifically, with reference to FIG. 3, the connecting element 44 is integrally constrained to the pushing bar 53.

The apparatus 1 also comprises means for adjusting the tensioning of the advancing belt 321.

A second control screw 7 defines the adjustment means for the apparatus 1.

The second control screw 7 allows the position of the pulley 323 to be adjusted for tensioning the advancing belt 321 during assembly.

The second control screw 7 is in fact only used during assembly of the inner guide body 32.

During use, that is to say, in order to adapt the curvature of the inner guide member 32, the second control screw 7 is not used, as described below.

FIGS. 6 to 9 illustrate an embodiment of a machine for handling bottles C comprising an apparatus according to the invention, hereinafter referred to simply as the machine 100.

More specifically, the machine 100 allows the accumulation of bottles with buffer conveyors, for example, according to a F.I.F.O (first-in first-out) logic.

Advantageously, the machine 100 is designed for handling glass and/or Tetra Pak bottles.

As illustrated in FIGS. 6 to 9, the machine 100 comprises more than one conveyor belt at the infeed, also called buffer conveyors, labelled 21, 21', 21", 21''' in the drawings, and with the direction of advancement A'.

Similar considerations are to be made if the machine 100 comprises more than one conveyor belt at the outfeed, that is to say, buffer conveyors used at the second conveyor belt 22.

Advantageously, in effect, the deflector device 3 is designed to be used both as an inlet head and as an outlet head in buffer conveyors.

Figure 7:
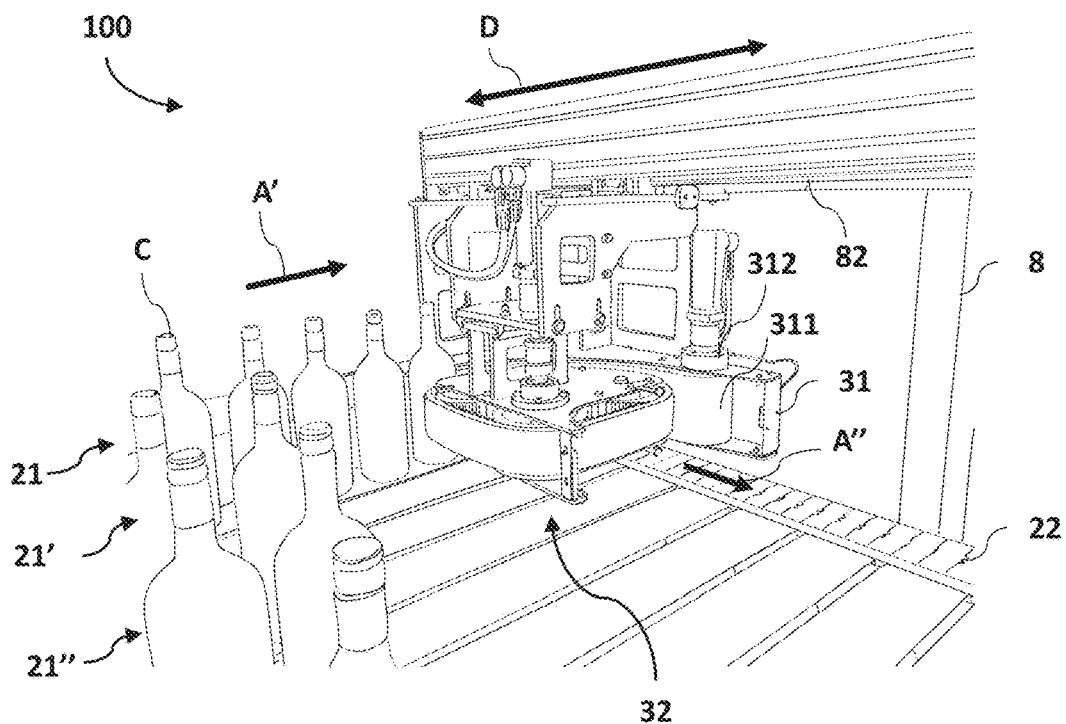
FIG. 7 is a schematic perspective view from a different angle of an embodiment of the machine for handling bottles according to the invention.

As illustrated in FIG. 7, the frame 8 comprises a further skid-guide coupling 82 which allows the entire deflector device 3 to be moved.

More specifically, thanks to the skid-guide coupling 82, the outer guide body 31 and the inner guide body 32 translate along a direction D substantially at right angles to the advancement direction A', as illustrated in the two configurations of FIGS. 8 and 9.

Similar considerations apply in the case in which outfeed buffer conveyors are used.

In that case, the skid-guide coupling 82 translates the outer guide body 31 and the inner guide body 32 along a direction substantially at right angles to the direction of advancement A".

In use, with particular reference to FIGS. 1 to 5, the deflector device 3 is positioned at the first conveyor belt 21 and the second conveyor belt 22 in such a way that the bottles C pass through the space delimited by the outer guide body 31 and by the inner guide body 32.

To put the outer guide body 31 and the inner guide body 32 in position, the skid 42 and the guide 41 are used and, if necessary, the skid-guide coupling 82.

In other words, the skid 42 and the guide 41 are configured to translate relative to each other the inner guide body 32 and the outer guide body 31.

After determining the relative position of the inner guide body 32 relative to the outer guide body 31, in the radial direction of translation E the radius of curvature of the advancing belt 321 is set suitable for the bottles C being processed.

In effect, depending on the size of the bottles C, the curvature of the inner guide body 32 is adjusted, whilst the curvature of the outer guide body 31 remains fixed.

The curvature of the inner guide body 32 is modified by acting on the control screw 51.

In that way, the pushing element 5 imparts a pressure on the tensioning element 43.

More specifically, by acting on the control screw 51, the angular drive 52 advances, causing the pushing bar 53 to rotate about the pin 54, as illustrated in FIG. 3.

The tensioning element 43, pushed by the pushing element 5, deforms elastically, bending.

While the tensioning element 43 bends, the guide pins 46 slidably engage in respective slots 326 made in the cover 325 for guiding the tensioning element 43 in its elastic deformation.

The connecting element 44, constrained to the pushing bar 53 and to the pulley 322, also advances, contributing to keeping the tensioning element 43 in a curved position, and determining the change in the radius of curvature of the inner guide body 32, maintaining the correct tension of the advancing belt 321.

In other words, thanks to the connecting element 44, it is not necessary to act on the second control screw 7 to guarantee the tensioning of the tensioning belt 321.

In effect, the second control screw 7 is used only during assembly of the guide body 32, after which the correct tensioning of the advancing belt 321 is determined by the variation in the position of the connecting element 44 with the advance of the pushing means 5.

The combined movement of the pushing means 5 and of the pulley 322 keeps the belt 321 under tension for each radius of curvature adopted by the inner guide body 32.

The correct curvature is obtained when the bottles C do not undergo oscillations or movements which can adversely affect the condition of the bottles.

The drive shaft 6 is then actuated to move the advancing belt 321 along the direction B, so as to allow the bottles C to vary their trajectory, from a first advancement direction A' to a second advancement direction A".

With reference to FIGS. 6 to 9, the machine 100, in addition to the process described above, comprises the step wherein the deflector device 3 is translated along a direction D.

In that way, the deflector device 3 is, on the one hand, at the end of a conveyor buffer (21, 21', 21") and, on the other hand, at the infeed of the second conveyor belt 22.

In other words, the machine 100, starting from the configuration illustrated in FIG. 8, moves to the configuration illustrated in FIG. 9.

The translation step along the direction D is repeated again each time it is necessary to change conveyor buffers (21, 21,', 21").

According to other embodiments not illustrated, the first A' and the second A" directions of advancement are curved, or only one of the two advancement directions is curved.

According to alternative embodiments not illustrated, at least one of either the first conveyor belt 21 or the second conveyor belt 22 comprises a motor for driving the belt.

According to embodiments not illustrated, there are more than or equal to two pulleys 322, 323, 324.

Configurations with a greater number of pulleys are, for example, advantageous for very large radiuses of curvature.

Configurations with a smaller number of pulleys are, for example, advantageous for smaller radiuses of curvature.

According to embodiments not illustrated, more than one pulley 322, 323, 324 is motor-driven.

This configuration is, for example, advantageous for very large radiuses of curvature.

According to embodiments not illustrated, a sponge is positioned on the surface of the outer guide body 31 in contact with the bottles C in order to absorb the impacts.

According to embodiments not illustrated, the skid 42 is connected to one of either the inner guide body 32 or the outer guide body 31, and a respective guide 41 is constrained to the other of either the outer guide body 31 or the inner guide body 32.

According to embodiments not illustrated, thanks to the skid 42 and the guide 41, the outer guide body 31 and the inner guide body 32 move towards each other along a direction of translation at right angles to one between the first A' and the second A" directions of advancement.

According to embodiments not illustrated, the pushing element 5 comprises a piston.

In other words, in this configuration the fork 55, the connecting rod head 56 and the threaded shaft 57 are replaced by a piston.

According to embodiments not illustrated, the connecting element 44 connects one of the pulleys 322, 323 to one of either the tensioning element 43 or the pushing element 5 for modifying the relative position of the pulley 322, 323 with respect to at least one of the other pulleys 322, 323, 324, when the tensioning element 43 is elastically deformed.

According to embodiments not illustrated, the curvature of the outer guide body 31 is also adjustable.

The apparatus and the machine for handling bottles according to the invention achieve the preset aims and brings important advantages.

A first advantage of the apparatus and of the machine according to the invention is the possibility of being easily adapted to different shapes of the bottles.

For example, without having to remove the side panel.

Another advantage is due to the fact that the apparatus and the machine according to this invention have an improved safety because it is not necessary to remove and install different inner guide bodies 32 for different applications.

This reduces the risks associated with this operation due to the significant weight, equal to approximately 20 kg, of the inner guide body 32.

A further advantage is the possibility of modifying the curvature of the inner side only of the apparatus, corresponding to the inner guide body 32.

Another advantage is due to the fact that the apparatus according to the invention is particularly suitable for handling bottles made of different materials, shapes and sizes, such as, for example, glass or Tetra Pak bottles.

Yet another advantage of the apparatus and of the machine according to the invention is due to the possibility of effectively managing buffer conveyors for transporting bottles.

More specifically, buffer conveyors for transporting bottles operating with F.I.F.O. logic.

A further advantage is due to the fact that the apparatus and the machine according to the invention allow the inner guide body 32 to be adapted without the need to tension the tensioning belt 321 by means of the control screw 7, since tensioning is performed automatically, by moving the tensioning element 43 using the pushing element 5.

Another advantage is due to the fact that the apparatus and the machine according to the invention can be easily adapted to different processing requirements without the need to carry out preliminary feasibility studies and redesign of the apparatus or the machine.

The invention claimed is:

1. Apparatus for handling bottles, comprising:
a first and a second conveyor belt to advance said bottles, said first conveyor belt having a first direction of advancement and said second conveyor belt having a second direction of advancement, wherein said first and second directions of advancement are incident to each other;
a deflector device to connect said first and second conveyor belts, comprising an outer guide body to contain said bottles during their advancement, and an inner guide body to contain said bottles on the opposite side with respect to said outer guide body, said inner guide body comprising a belt to advance said bottles, closed in a loop on respective pulleys of which at least one is motorized, characterized in that it comprises conditioning means to change the configuration of said inner guide body by varying its relative position with respect to said outer guide body and the radius of curvature of said advancing belt, said conditioning means comprising a skid constrained to one between said inner guide body and outer guide body, and a respective guide constrained to the other between said outer guide body and inner guide body, said skid and said guide being configured to reciprocally translate between each other said inner guide body and outer guide body, said conditioning means further comprising a pushing element for pushing a respective tensioning element for tensioning said belt, said pushing element comprising adjustment means configured to vary the thrust applied on said tensioning element and said curvature of said belt.

2. The apparatus according to claim 1, wherein said first and second directions of advancement are rectilinear and perpendicular to each other.

3. The apparatus according to claim 1, wherein said tensioning element is positioned within a ring defined by said belt, said tensioning element being elastically deformable to cause said belt to adopt multiple different radii of curvature.

4. The apparatus according to claim 1, wherein said tensioning element has at least one recess of preferential deformation.

5. The apparatus according to claim 1, wherein said pushing element of said tensioning element comprises adjustment means designed to vary the thrust applied on said tensioning element.

6. The apparatus according to claim 1, wherein said conditioning means comprise a connecting element to connect one of said pulleys to one between said tensioning element and said pushing means to change the relative position of said pulleys with respect to at least one of said other pulleys when said tensioning element is elastically deformed.

7. The apparatus according to claim 1, wherein said inner guide body comprises a cover, wherein said tensioning element comprises a plurality of guide pins designed to engage in a sliding fashion within respective slots formed in said cover to guide said tensioning element in its elastic deformation.

8. A bottle handling machine, comprising:
a first and a second conveyor belt to advance said bottles, said first conveyor belt having a first direction of advancement and said second conveyor belt having a second direction of advancement, wherein said first and second directions of advancement are incident to each other;
a deflector device to connect said first and second conveyor belts, comprising an outer guide body to contain said bottles during their advancement, and an inner guide body to contain said bottles on the opposite side with respect to said outer guide body, said inner guide body comprising a belt to advance said bottles, closed in a loop on respective pulleys of which at least one is motorized, characterized in that it comprises conditioning means to change the configuration of said inner guide body by varying its relative position with respect to said outer guide body and the radius of curvature of said advancing belt, said conditioning means comprising a pushing element for pushing a respective tensioning element for tensioning said belt, said pushing element comprising adjustment means configured to vary the thrust applied on said tensioning element and said curvature of said belt, said tensioning element is positioned within a ring defined by said belt, said tensioning element being elastically deformable to cause said belt to adopt multiple different radii of curvature, and wherein said tensioning element has at least one recess of preferential deformation.

9. A bottle handling machine, comprising:
a first and a second conveyor belt to advance said bottles, said first conveyor belt having a first direction of advancement and said second conveyor belt having a second direction of advancement, wherein said first and second directions of advancement are incident to each other;
a deflector device to connect said first and second conveyor belts, comprising an outer guide body to contain said bottles during their advancement, and an inner guide body to contain said bottles on the opposite side with respect to said outer guide body, said inner guide body comprising a belt to advance said bottles, closed in a loop on respective pulleys of which at least one is motorized, characterized in that it comprises conditioning means to change the configuration of said inner guide body by varying its relative position with respect to said outer guide body and the radius of curvature of said advancing belt, said conditioning means comprising a pushing element for pushing a respective tensioning element for tensioning said belt, said pushing element comprising adjustment means configured to vary the thrust applied on said tensioning element and said curvature of said belt, wherein said tensioning element is positioned within a ring defined by said belt, said tensioning element being elastically deformable to cause said belt to adopt multiple different radii of curvature, and wherein said inner guide body comprises a cover, wherein said tensioning element comprises a plurality of guide pins designed to engage in a sliding fashion within respective slots formed in said cover to guide said tensioning element in its elastic deformation.

* * * * *